United States Patent [19]

Grabowski

[11] Patent Number: 5,001,248
[45] Date of Patent: Mar. 19, 1991

[54] SILICONE SURFACTANTS

[75] Inventor: Wojciech Grabowski, Versoix, Switzerland

[73] Assignee: Union Carbide Chemicals and Plastics Company Inc., Danbury, Conn.

[21] Appl. No.: 39,157

[22] Filed: Apr. 16, 1987

[30] Foreign Application Priority Data

Apr. 22, 1986 [GB] United Kingdom ................. 8609803

[51] Int. Cl.$^5$ .............................................. C07F 7/08
[52] U.S. Cl. ..................................... 556/456; 556/445
[58] Field of Search ................................. 556/456, 445

[56] References Cited

U.S. PATENT DOCUMENTS

| | | | |
|---|---|---|---|
| 3,179,678 | 4/1965 | Daughenbaugh | 556/456 X |
| 3,186,964 | 6/1965 | Kookootsedes et al. | 556/456 X |
| 3,231,496 | 1/1966 | Pater | 556/456 X |
| 3,445,389 | 5/1969 | McKellar | 556/456 X |
| 4,299,923 | 11/1981 | Baskont et al. | 556/456 X |

Primary Examiner—Paul F. Shaver
Attorney, Agent, or Firm—Brooks, Haidt, Haffner & Delahunty

[57] ABSTRACT

The invention relates to silicone surfactants having the general formula:

$$MD_xD'_yM$$

wherein M is a $(CH_3)_3SiO_{0.5}$— group; D is a $—(CH_3)_2SiO—$ group; D is a $—(CH_3)(R^2)SiO—$ group, in which $R^2$ is a non-linear hydrocarbyl group; x is 0 or an integer from 1 to 20 and y is an integer from 1 to 20. The silicone surfactants of the present invention are effective polyurethane foam stabilisers and are effective in amounts smaller than previously used commercially thereby leading to savings in costs.

5 Claims, No Drawings

SILICONE SURFACTANTS

The present invention relates to silicone surfactants for use as stabilisers in the preparation of polyurethane foams.

Polyurethane foams are generally prepared by formulating a polyfunctional isocyanate with an organic compound containing two or more active hydrogens (e.g. a polyfunctional alcohol (a polyol)) in the presence of one or more catalysts and a blowing agent. In addition to these compounds, it has been previously found desirable to add a foam stabiliser to the formulation. The function of the foam stabiliser is to prevent collapse of the foam during its manufacture and to ensure that the finished foam has a uniform cell structure with as few defects as possible.

GB No. 1,143,206 and GB No. 1,143,205 respectively describe a family of hydrolytically stable silicone surfactants and their use in the manufacture of polyester and rigid polyurethane foams. These silicone surfactants can be represented by the general formula $$(CH_3)_3SiO((CH_3)_2SiO)_q(CH_3(R)SiO)_pSi(CH_3)_3$$

wherein
$R = H(OC_2H_4)_x(OC_3H_6)_yO(CH_2)_z$ and
p,q,x,y and z are integers.

The methods used to manufacture these silicon surfactants generally result in a mixture of compounds having the above formula with a range of molecular weights. Hence commercially available silicone surfactants, are usually represented by the above general formula with non-integer values for p,q,x,y and z. For convenience silicone surfactants such as these are known by the abbreviated formula $MD_qD'_pM$ where M corresponds to a terminal trimethylsilyl having the formula $(CH_3)_3SiO_{0.5}$, D corresponds to $—(CH_3)_2SiO—$ and $D^1$ corresponds to $—(CH_3)(R)SiO—$ wherein R is as above. The relative proportions of D to D' to a certain extent control the properties of the silicone surfactant.

Silicone surfactants of the above type can be regarded as being derived from dimethylsilicone oils by replacement of methyl groups by R groups. This suggests a method for their manufacture as described in GB No. 1,132,719 in which dimethylsilicone oils are reacted with a source of R radicals e.g. an olefin and a radical abstracting agent such as a peroxide. Alternatively these silicone surfactants can be prepared by cohydrolysing a halosubstituted version of the oil or of a lower molecular weight silicon compound with a source of the R group having an active hydrogen e.g. the alcohol $H(OC_2H_4)_x(OC_3H_3)_yOH$ In addition to the dimethylsilicone oil type, other MDD'M surfactants having D groups of the formula $(R^1)_2Si$, where $R^1$ is a monovalent hydrocarbyl radical, have also been described as for example in GB No. 1,388,332.

It has now been found that silicone surfactants having the general formula $MD_xD'_yM$, wherein D' is a $—(CH_3)(R^2)SiO—$ group in which $R^2$ is a non linear hydrocarbyl group, are especially effective as stabilisers for the preparation of polyurethane foam relative to those described in the prior art. In particular, it has been found that, by using the silicone surfactants of the present invention, it is possible to make a significant reduction in the amount of silicone surfactant required to stabilise a given foam.

Accordingly, the present invention provides a silicone surfactant having the formula $$MD_xD^1_yM$$

wherein
M is a $(CH_3)_3SiO_{0.5}—$ group
D is a $—(CH_3)_2SiO—$ group
D' is a $—(CH_3)(R^2)SiO—$ group in which $R^2$ is a non-linear hydrocarbyl group
x is 0 or an integer from 1 to 20 and y is an integer from 1 to 20.

The silicone surfactants of the present invention are useful as stabilisers in the production of polyurethane foam. Hence, in an embodiment of the invention, there is also provided a process for the manufacture of polyurethane foam which process comprises reacting and foaming a mixture comprising an organic isocyanate having at least two isocyanate groups, an organic compound having at least two active hydrogen atoms, a catalyst, a blowing agent and a foam stabiliser which comprises a silicone surfactant as defined above.

As regards the $R^2$ group in the above formula this is preferably a $C_1$ to $C_{20}$ non-linear hydrocarbyl group comprising a linear hydrocarbyl backbone substituted with one or more methyl groups. Preferably the $R^2$ group is a non-linear alkyl group having between 4 and 12 carbon atoms in total. Examples of preferred $R^2$ groups include methyl substituted propyl, butyl, pentyl, hexyl, heptyl and octyl groups. Selected examples of such groups are the 2-methylpropyl, 2-methylbutyl, 4-methylpentyl, 3,3-dimethylbutyl, 2,3-dimethylbutyl and 3-methylbutyl groups.

In addition to those groups described above, $R^2$ can also be a non-linear hydrocarbyl group comprising a linear mixed carbon/silicon or carbon/oxysilicon backbones substituted with one or more methyl groups. Examples of such non-linear hydrocarbyl groups are $—CH_2CH_2CH_2Si(CH_3)_3$, $—CH_3CH_3CH_3OSi(CH_3)_3$ and the like.

D and D' groups defined above, are bonded together to form the backbone of the silicone surfactant. The backbone is capped with M groups. Preferably the silicone backbone is of a length such that $x+y$ is in the range 1 to 20, preferably 1 to 10. In practice commercially available versions of these surfactants will comprise a range of molecules having differing values of x and y. Hence commercially available materials will be characterised by averaged non-integer values of x and y.

A particularly preferred sub-class of the silicone surfactants of the present invention are those having the general formula:

$$MD'_yM$$

wherein M, D' and y are as defined above. Such compound, referred to as 'D-units free' surfactants have the advantage that they can be made reproducibly and to consistent compositions.

The silicone surfactants of the present invention are useful in the manufacture of polyurethane foams and in particular high resilience (HR) polyurethane foams. If such silicone surfactants are applied to the polyurethane foam-forming formulation in a water stream it may be necessary to add secondary agents to render the silicone surfactants which are hydrophobic, soluble in water.

In carrying out the polyurethane foam-forming reaction, an organic isocyanate having at least two isocyanates groups is reacted with an organic compound having at least two active hydrogen atoms. Any such organic isocyanate can be used in principle for such a reaction and suitable materials include both isocyanates themselves and isothiocyanates. Suitable organic isocyanates include alkylene diisocyanates e.g. hexamethylene diisocyanate; aromatic diisocyanates e.g. toluene diisocyanate (TDI) and xylene diisocyanates, diphenylmethane-4,4'-diisocyanate, crude MDI, 1-methyl-2,4-diisocyanatocyclohexane and the like. Low molecular weight prepolymers of such organic isocyanates with for example a polyol or polyamine can also be used.

The organic compound having at least two active hydrogen atoms is preferably either a polyamine or a polyol. Most preferably the polyol is a polyether polyol prepared by reacting a low molecular weight polyfunctional alcohol e.g. glycerol, trimethylolpropane, 1,2,6-hexanetriol, pentaerythritol, sorbitol, sucrose and the like, with one or more alkylene oxides. The alkylene oxide are preferably lower alkylene oxides for example, ethylene oxide, propylene oxide, butylene oxide or mixtures thereof. Polyether polyols produced by this method can be made with a range of physical and chemical properties depending upon the exact nature of variables such as the degree of polymerisation, the relative proportions of the different alkylene oxides in the polyether part of the molecule and the particular alkylene oxides used.

In addition to polyether polyols, it is also possible to use polymer/polyols (also known in the art as graft polyols). These materials, which comprise, for example, a polyether polyol onto which has been grafted a polymer such as a styrene/acrylonitrile copolymer, have been fully described in for example GB No. 1,412, 797 and our pending European patent application No. 137,723A which are incorporated by reference.

When a polyether polyol or a polymer polyol is used it is preferably one which (a) has a functionality in the range 2 to 6 and (b) has at least 20%, preferably at least 50% of its hydroxyl groups as primary hydroxyl groups.

As regards the relative proportions of isocyanate and organic compound having at least two active hydrogen atoms, the amounts of each used are such as to provide suitably an isocyanate: organic compound ratio of between 0.8 and 1.2 preferably 0.9 and 1.1 when calculated on an equivalent basis.

As the polyurethane foaming reaction is base catalysed the reaction is suitably carried out in the presence of a base catalyst. The base catalyst may be any one of a wide range of inorganic or organic bases. Particularly suitable examples of catalysts include tertiary amines e.g. tributylamine, $[(CH_3)_2N(CH_2)]_2O$, N-methylmorpholine, DABCO, TBD, 1,3-propanediamine and organic tin compounds e.g. tin (II) alkoxides, tin (II) carboxylates, dialkyl tin salts of carboxylic acids or hydrohalic acids.

Other catalysts, for example derivates of lead, antimony, titanium and mercury which are not so widely used in industry can also be used.

The amounts of such catalyst which are to be used will be familiar to the skilled man.

In order to produce a foam it is necessary to have a blowing agent present during the polyurethane forming reaction. Preferably the blowing agent is either water or a fluorocarbon such as dichlorodifluoromethane, 1,1-dichloro-1 fluoroethane, 1-chloro-1,1-difluoroethane, 2,2-dichloroethane and the like. The amount of blowing agent required will vary according to the density of the foam which is desired. Suitable levels of blowing agent will be familiar to the skilled man.

In preparing the foam formulation, the silicone surfactant is generally added in an amount in the range $1.0 \times 10^{-2}$–$22 \times 10^{-2}$ parts by weight/100 parts by weight of organic compound having at least two active hydrogen atoms although more can be used if desired. However in order to take advantage of the superior foam stabilising properties of the silicone surfactants of the present invention, it is preferable to use levels in the range $1.0 \times 10^{-2}$–$5 \times 10^{-2}$.

The silicon surfacts of the present reaction may be conveniently prepared by reacting and appropriate olefin with a silicone hydride of appropriate formula in the presence of a catalyst.

The following examples illustrate the present invention.

EXAMPLE 1

A polyurethane foam formulation comprising 100 parts of polyol A (comprising a polyethylene oxide/polypropylene oxide polyether polyol containing 35% by weight grafted polystyrene/acrylonitrile) 2.8 parts water, a catalyst package comprising 0.7 parts DABCO and 0.1 parts of a tertiary amine catalyst, and 0.049 parts of a mixture of silicone surfactants of formula $$[(CH_3)_3SiO_{0.5}][(CH_3)((CH_3)_2CH(CH_2)_3)SiO]_a[O_{0.5}Si(CH_3)_3]$$

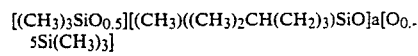

$a = 1$ to $10$ was prepared in a square mould. The resulting polyurethane foam had good structure and breathability.

Although more silicone surfactant is added in this Example than is usual, this arises because a polyol of very high solids content is used (36% by weight). In order to process such a polyol an extremely efficient surfactant is required if low levels are to be used. This Example shows that silicone surfactants of the present invention have this property.

COMPARATIVE TEST A

Example 1 was repeated except that 0.16 parts of the silicone surfactant $[(CH_3)_3SiO_{0.5}][(CH_3)_2SiO]_{1.7}[(CH_3)(R)SiO]_{1.0}[O_{0.5}Si(CH_3)_3]$ (where $R = C_3H_6(OCH_2CH_2)_3OCH_3$) was used. The foam produced was unstable and collapsed before solidification occurred.

COMPARATIVE TEST B

Comparative Test A was repeated except that 0.70 parts of the silicone surfactant $[(CH_3)_3SiO_{0.5}][(CH_3)_2SiO]_{1.85}[(CH_3)(R)SiO]_{12}[O_{0.5}Si(CH_3)_3]$, wherein $R =$ (a) 80% $C_3H_6(OC_2H_4)_3OCH_3$ and (b) 20% $C_3H_6(OCH_2CH(CH_3))_3OH$, was used. The resulting polyurethane foam had good structure and breathability.

The results given above show that by using the silicone surfactants of the present invention it is possible to reduce considerably the amount of surfactant required to produce satisfactory foams relative to the prior art.

EXAMPLE 2

100 parts of polyol U1315, (polymer polyol; MW=5,000, 15% solids in a polyol having 14% EO and 80% primary hydroxyl), 3 parts of water, 0.05 parts of an amine catalyst (A-99, [(CH$_3$)$_2$N(CH$_2$)$_2$]$_2$O, 0.0018 parts of a tin catalyst (0.4% of [CH$_3$(CH$_2$)$_2$CH$_2$]Sn[SCH$_2$(CH$_2$)$_{10}$CH$_3$]$_2$ in polyol) and 0.5 parts of DABCO were mixed with 0.03 parts of a mixture of silicone surfactants of formula [(CH$_3$)$_3$SiO$_{0.5}$][(CH$_3$)((CH$_3$)$_3$CCH$_2$CH$_2$)SiO]$_a$ [O$_{0.5}$Si(CH$_3$)$_3$] a=1 to 10.

The foam produced had a good structure and breathability.

EXAMPLE 3

This example illustrates the preparation of the silicone surfactant used in Example 2. By using the appropriate olefin this method can be used to prepare any of the silicone surfactants of the present invention.

43 g of 3,3 dimethybutene-1 was placed in a 250 cc jacketed glass reactor equipped with an agitator, a platinum temperature probe, a condensor and a dropping funnel. 2 drops of a 10% solution of H$_2$PtCl$_6$ in ethanol were added to the olefin. The mixture was heated to 45° C. and 60 g of silicone hydride equilibrate were added slowly (in 10 equal portions) from the dropping funnel under vigorous stirring conditions. After 2 hours the reaction mixture was heated to 65° C. and maintained at this temperature for 1 hour. At the end of this time, infrared spectroscopy indicated the presence of less than 1 mole % of SiH bonds in the product. The mixture was cooled, small amounts of sodium bicarbonate added and stirred for a further 30 mins. Excess of volatiles was removed under vacuum to leave the silicone surfactant.

COMPARATIVE TEST C

Example 2 was repeated except that the silicone surfactant used was the same as in Comparative Test A at 0.19 parts/100 parts of polyol. A foam of good structure but with a tendency to shrink was produced.

COMPARATIVE TEST D

Example 2 was repeated except that 0.09 parts of distilled dimethylsilane oil was used. The foam had a structure, which was poorer than in Example 2.

EXAMPLES 4–8 AND COMPARATIVE TESTS E-N

A series of polyurethane foam formulations comprising:

|  | Parts by weight |
| --- | --- |
| Polyol 1315 | 100 |
| Water | 3 |
| DABCO | 0.55 |
| A-1 amine catalyst | 0.1 |
| silicone surfactant | see Table | were prepared in a car-seat mould having cushion and side roll areas. The properties of the foam after curing are given in the Table.

In the Table silicone surfactant A=silicone surfactant described in Example 1 silicone surfactant B=silicone surfactant described in Comparative Test A silicone surfactant C=Dimethylsilicone oil surfactant (MD$_{2M}$ where z=3 to 8)

The polyurethane foams produced were characterised by three parameters.

FOAM STRUCTURE

This test is subjective and judged by eye. The lowest acceptable figure is 6–7 with a higher figure indicating a better foam structure.

The results in the Table show that silicone surfactants of the present invention produce foams of better structure relative those surfactants derived from dimethyl silicone oils.

SHRINK

This parameter measures the shrinkage which occurs when the cured foam is crushed. The foams made using silicone surfactants of the present invention show no tendency to shrink.

SIDE VOIDS

The presence of side voids in the foam reflect difficulties in filling the mould during foaming. No side voids were observed when silicone surfactants of the present invention were used.

TABLE

| Example/ Comparative Test | Silicone | Silicone amount 10$^2$ | Foam Density kg/m$^3$ | Shrink | Foam Structure | Side Voids |
| --- | --- | --- | --- | --- | --- | --- |
| 4 | A | 2.8 | 56 | 0 | 10 | None |
| 5 |   | 3.5 | 42 | 0 | 10 | None |
| 6 |   | 3.5 | 58 | 0 | 12 | None |
| 7 |   | 4.2 | 39 | 0 | 7 | None |
| 8 |   | 4.2 | 60 | 0 | 12 | None |
| E | B | 15 | 51 | 0 | 10 | Yes |
| F |   | 15 | 55 | 0 | 10 | None |
| G |   | 20 | 41 | 0 | 6 | None |
| H |   | 20 | 50 | 3 | 12 | None |
| I | C | 7.2 | 43 | 1 | 5 | V. severe |
| J |   | 7.2 | 51 | 1 | 8 | None |
| K |   | 8.4 | 42 | 0 | 5 | V. severe |
| L |   | 8.4 | 50 | 0 | 8 | None |
| M |   | 9.6 | 42 | 0 | 5 | V. severe |
| N |   | 9.6 | 50 | 1 | 10 | None |

I claim:

1. A silicone surfactant having the general formula:

$$MD_xD'yM$$

wherein

M is a (CH$_3$)$_3$SiO$_{0.5}$—group

D is a —(CH$_3$)$_2$SiO—group

D' is a —(CH$_3$)(R$^2$)SiO—group in which R$^2$ is a non-linear group selected from the group consisting of
  (1) non-linear alkyl groups having between 4 and 12 carbon atoms,
  (2) linear mixed carbon/silicon backbones substituted with one or more methyl groups, and
  (3) linear mixed carbon/oxysilicon backbones substituted with one more methyl groups, x is 0 or an integer from 1 to 20 and y is an integer from 1 to 20.

2. A silicone surfactant as claimed in claim 1 wherein x is 0 or an integer from 1 to 10 and y is an integer from 1 to 10.

3. A silicone surfactant as claimed in claim 1 wherein $R^2$ is selected from the group consisting of 2-methylpropyl, 2-methylbutyl, 4-methylpentyl, 3,3-dimethylbutyl, 2,3-dimethylbutyl and 3-methylbutyl.

4. A silicone surfactant as claimed in claim 1 wherein the sum of the integers x and y is in the range 1 to 10.

5. A silicone surfactant as claimed in claim 2 selected from the group consisting of $[(CH_3)_3SiO_{0.5}][(CH_3)((CH_3)_2CH(CH_2)_3)SiO]_a[O_{0.5}Si(CH_3)_3]$ and $[(CH_3)_3SiO_{0.5}][(CH_3)((CH_3)_3CCH_2CH_2)SiO]_a[O_{0.5}Si(CH_3)_3]$ wherein a is an integer from 1 to 10.

* * * * *

UNITED STATES PATENT AND TRADEMARK OFFICE
CERTIFICATE OF CORRECTION

PATENT NO. : 5,001,248

DATED : March 19, 1991

INVENTOR(S) : WOJCIECH GRABOWSKI

It is certified that error appears in the above-identified patent and that said Letters Patent is hereby corrected as shown below:

Col. 1, line 28, "$_x(OC3^H6)_y$" should read --$_x(OC_3H_6)_y$--

Col. 8, line 8, correct the formula to read

--$[(CH_3)_3SiO_{0.5}][(CH_3)((CH_3)_3CCH_2CH_2)SiO]_a[O_{0.5}Si(CH_3)_3]$--.

Signed and Sealed this

Seventeenth Day of November, 1992

Attest:

DOUGLAS B. COMER

Attesting Officer

Acting Commissioner of Patents and Trademarks